United States Patent Office 3,249,986
Patented May 10, 1966

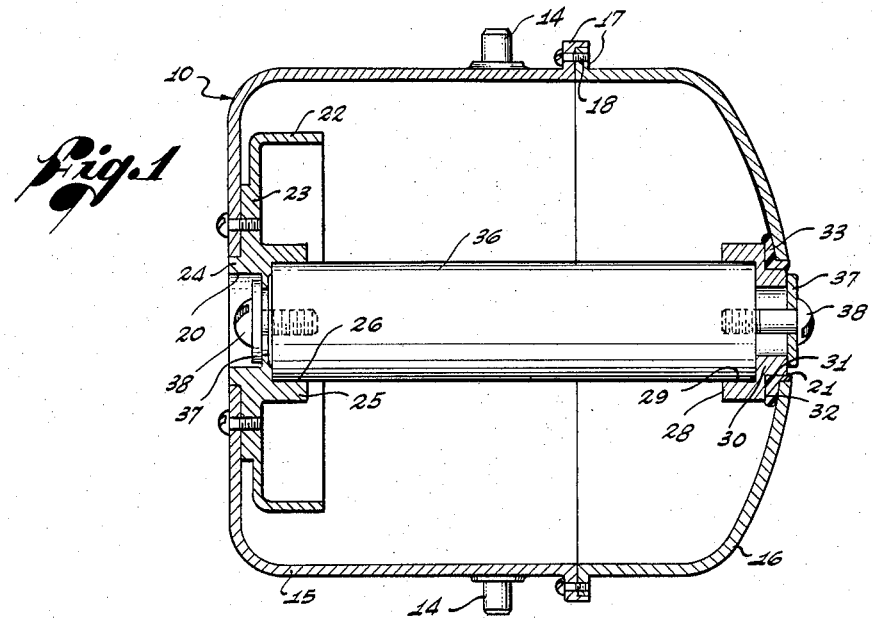

3,249,986
APPARATUS AND METHOD FOR ALIGNING AND
SUPPORTING GYROSCOPE BEARINGS
John S. Adkins, 2555 La Mesa Drive,
Santa Monica, Calif.
Filed Aug. 31, 1964, Ser. No. 393,041
6 Claims. (Cl. 29—148.4)

This invention relates generally to the construction of a support structure for gyroscope bearings, and more particularly to a method and apparatus for achieving precise and accurate alignment of gyroscopic reference instruments.

In gyroscopic reference instruments, the pairs of end bearings supporting the rotor and gimbal trunnions must be aligned so that the bearing races are both coaxial and parallel to each other within extremely close limits. If this is not done, there is excessive friction in the bearings and any such friction in the gimbal bearings induces random free drift in the gyro. This in turn directly affects the accuracy of the reference signals unless corrected. Since under certain flight conditions, the gyro must be free and unservoed to any correcting device, such as a magnetic compass or pendulum, the rate of random free drift of the gyro is generally considered as an index of its degree of accuracy, and thus bearing friction becomes a most important factor.

While there are various ways of achieving accurate bearing alignment in gyro bearings, most of them require very expensive machinery and tools, and can only be achieved by the most skilled mechanics proceeding through a series of time-consuming steps with frequent checking and a high rejection rate of parts. The present invention avoids these expensive operations and gyros embodying it may be assembled and precisely aligned by relatively unskilled production workers. At the same time, the degree of accuracy achieved is at least as good as that accomplished by the most advanced metal working techniques.

My present invention is related to that disclosed and claimed in my issued United States Patent No. 2,919,586, issued January 5, 1960, and entitled "Gyroscope," and constitutes an improvement over it in a simplification and reduction of parts which permits even further economies of manufacture with no reduction in the degree of accuracy achieved.

Briefly, the subject invention relates to an alignable bearing support structure for supporting pairs of ball bearings in opposed spaced relationship with the bearings being in exact coaxial and parallel relationship without being in any way limited by the accuracy of the gimbal or frame itself. This is accomplished by providing an alignable bearing holder or cup which is freely shiftable relative to one end of the gimbal or frame structure and which may be held on the end of a mandrel or jig that is at the same time positioned with respect to the bearing supporting structure at the opposite end of the gimbal. The alignable bearing cup is then secured in place, as by cement, so that it becomes a permanent part of the gimbal structure. Both bearings, however, may be removed and replaced during overhauls, without changing the alignment or requiring realignment.

With the foregoing in mind, it is an important object of my invention to provide apparatus for accurately aligning and supporting gyroscope bearings which is of a simplified construction.

Another object of the invention is to provide a supporting structure for gyroscope bearings wherein all of the alignment is accomplished by movement of an alignable bearing holder at one end of the supporting frame. This allows the other end to be provided with either an integral bearing holder or a centerfitted holder to insure concentricity of synchro housings and other parts in a simple manner.

A further object of this invention is to provide a simplified method for bearing alignment which can be quickly accomplished by relatively unskilled workers.

These and other objects and advantages of the invention will become apparent from the following detailed description of a preferred form thereof and from an inspection of the accompanying drawings, in which:

FIGURE 1 is a medial cross-section of a typical gyroscopic gimbal structure embodying the invention showing the aligning mandrel in place while the alignable bearing cup is being cemented in position;

FIGURE 2 is a cross-section similar to FIGURE 1 showing the aligning mandrel removed and the gimbal ball bearings in place and supporting an inner gimbal assembly; and FIGURE 3 is an enlarged detail taken in the area 3 of FIGURE 2 showing the manner in which the alignable bearing cup is secured to the supporting frame.

Referring now to the drawings and particularly to FIGURE 2, the numeral 10 indicates an outer gyro gimbal which is adapted to support an inner gimbal assembly 11 by means of a pair of ball bearings 12 which rotatably journal inner gimbal trunnions 13. The general construction is typical of that of gyroscopic reference instruments and the outer gimbal may in turn be supported in an outer frame (not shown). Generally, such instruments provide for several axes of freedom and the invention is applicable to the bearing construction of all the gyro gimbals as well as the gyro rotor.

As previously mentioned, any friction in the bearings 12 by which the inner gimbal 11 is mounted in the outer gimbal 10 will cause the gyro to drift and create errors in the gyro signal. To prevent this, it is necessary that the bearings 12 be exactly aligned so that they are precisely coaxial with the races parallel to each other. It is with the method and structure for achieving such precise bearing alignment in a simple and economical manner that this invention is concerned.

Turning now to FIGURE 1, it will be seen that the outer gimbal frame 10 is shaped as a hollow shell and is formed in the left and right hand halves 15 and 16, respectively, each having an end wall which supports one of the bearings 12 which are spaced apart along a horizontal axis. The frame members 15 and 16 must be separable to allow the inner gimbal parts to be assembled in place and replaced or repaired, and it is important that they always go together in the same position of registration. To this end, both frame members 15 and 16 are formed with mating flange portions 17 that are adapted to be firmly secured together by a plurality of circumferentially disposed screws 18. The arrangement of the screws 18 is such that the frame parts 15 and 16 can only be put together in one position, thus insuring the maintenance of the original alignment throughout the life of the device.

Along the center or horizontal axis of the frames 15 and 16 they are provided with circular end openings 20 and 21, respectively, which are generally coaxial within ordinary machining tolerances. It is difficult, however, to get such spaced openings in a machined frame exactly coaxial, and if the gimbal bearings were mounted so as to be referenced with respect to the openings 20 and 21, they might not be exactly coaxial. It can also be appreciated that the end walls of the frame members 15 and 16 may not be exactly parallel if manufactured by ordinary machining or stamping techniques. Thus, if the surfaces of the end walls are used to determine the parellelism of the gimbal bearings, they may not be positioned in exact parallelism.

To avoid these problems, I mount one of the gimbal bearings in a holder or other structure fixed with respect to one of the frame ends and mount the other in an alignable holder which can be referenced exactly with respect to the other frame end by an accurate mandrel or jig. As illustrated, the left hand gimbal bearing is designed to be fixedly mounted with respect to the frame 15, while the right hand bearing is alignable with respect to the frame 16.

In gyro instruments, it is often desired to mount synchros for determining the relative angular position of the inner and outer gimbals, and a generally cylindrical synchro housing 22 having a closed end wall 23 is concentrically mounted with respect to end opening 20 by a circular boss 24 which center-fits within the end opening. The housing 22 is then secured in place by outer screws 25 which engage through the end wall of the frame. The housing 22 also forms a holder or cup to support one of the gimbal bearings by means of an inner circular wall or cup 25 which is formed with an internal shouldered seat 26. The surface of seat 26 is adapted to slidably receive and engage with the outer race of the gimbal bearing and hold it tightly in position. As can be understood, the bearing cup as shown may be formed integrally with the frame 15 in some cases, and in any event, it may be simply and economically machined without any troublesome in-line boring, reaming or tapping operations such as have heretofore been used to try to form accurate seats for opposed gimbal bearings.

At the other frame end, I provide an alignable bearing holder or cup 28 which is of generally cylindrical shape and has an inner seat surface 29 adapted to slidably receive and engage with the outer race of the other gimbal bearings. On its outer surface cup 28 has a stepped outer end boss 30 defining right angular mounting surfaces 31 and 32, which face the inner peripheral surface of the opening 21 and the adjacent flat surface of the inner side of frame 16, respectively. As is best seen in the detail of FIGURE 3, cup surface 31 is a loose fit within opening 21 and the cup is adapted to be secured in position by a layer of cement 33 applied to surfaces 31 and 32. While other securing means may be used, a resin type cement will give a very strong bond and is preferred. Because of the loose fit of cup 28 to frame 16, it is adapted to be shifted rather by tilting or rocking or by lateral movement relative to the supporting surfaces on the frame 16 so that it may be precisely positioned with respect to gimbal seat 26 in exact coaxial relationship.

Alignment is accomplished by means of aligning mandrel or jig 36 which takes the form, as shown, of a straight cylindrical rod which is accurately machined and ground so that its end portions are exactly coaxial and parallel. Mandrel 36 is of such diameter that its ends are adapted to fit tightly in the bearing cup seats 26 and 29. Thus, cup 28 is positioned coaxially in alignment with the bearing cup 25, regardless of any misalignment between openings 20 and 21, or lack of parallelism of the frame end walls. Mandrel 36 may be secured to the cups 25 and 28 to obtain correct spacing by outer lock washers 37 and screws 38 which engage in the ends of the mandrel.

In order to get the mandrel in position, it is necessary to separate the frame members 15 and 16. One end of the mandrel 36 is then fitted into seat 25 and the cup 28 is secured in place on the other end of the mandrel with a coating or layer of cement 33 on the surfaces 31 and 32. The frame member 16 is then placed around the mandrel 36, and flanges 17 locked together by screws 18. The cup 28 assumes a position relative to frame 16 which is independent of the position of opening 21 and the surface of the end wall.

As is illustrated in FIGURE 3, the position may be such that the cup 28 is somewhat eccentric to opening 21 and tilted with respect to the end wall. It can be appreciated, however, that regardless of the position of cup 28 relative to opening 21 and the end wall, it remains exactly coaxial with the other bearing cup 25. After cement 33 has been cured, mandrel 36 is removed and the bearings 12 are mounted in place in the bearing cups. In assembly, the trunnions 13 are fitted into bearings 12 and substantially frictionless support of the inner gimbal assembly is thus assured.

The configuration of the bearing cup mounting surfaces and the supporting surfaces of the frame may be quite different than those illustrated. So long as the shape and relative dimensions of the bearing cup and frame provide sufficient clearance to allow the cup 28 to maintain its aligned position on the mandrel 36, the surfaces can be varied to meet different design considerations. The bearing holder may also engage the inner race of the bearing rather than the outer race, and there is likewise considerable latitude in the type of aligning mandrel which may be used.

Regardless of such changes, it is seen that I have provided a very simplified method and apparatus for achieving precise alignment of the bearings, and the invention is not limited to any of the details of the preferred embodiment except as defined in the appended claims.

I claim:

1. Apparatus for aligning and positioning pairs of bearings in spaced aligned relationship which comprises: a supporting frame having spaced end members, one of said end members being provided with holding means tightly secured to said end member to removably receive a bearing therein in a predetermined fixed relationship to said end member and the other of said end members having a supporting surface therein; an alignable bearing holder having a receiving surface adapted to removably engage a bearing and hold it in fixed relationship relative to said holder and a mounting surface by which it may be supported in said supporting surface, said mounting and supporting surfaces being shaped and dimensioned with substantial clearance therebetween to allow tilting and shifting of said holder relative to said frame to align said bearing holder in exact coaxial alignment with said bearing receiving means in said first mentioned end member; and retaining means to permanently secure said second bearing holder in said aligned position in said supporting frame.

2. Apparatus for aligning and positioning pairs of bearings in spaced aligned relationship which comprises: a pair of bearing holders each having a receiving surface adapted to removably engage a bearing and hold it in fixed relationship relative to said holder and a mounting surface by which it may be supported; a pair of bearings removably mounted in said holders; a supporting frame having separable end members, one of said end members having a supporting surface shaped to rigidly engage the mounting surface of one of said holders and the other end member having a supporting surface shaped to allow tilting and shifting of the second bearing holder relative thereto to align said bearing holders in exact coaxial and parallel alignment with each other; means for releasably securing said end members in a registered position to permit the insertion and removal of a mandrel therebetween; and retaining means to permanently secure said second bearing holder in said aligned position in said supporting frame.

3. Apparatus for aligning and positioning pairs of bearings in spaced aligned relationship which comprises: a pair of bearing cups each having an internal surface adapted to removably engage a bearing race and hold it in fixed relationship relative to said cup and outer mounting surface by which it may be supported; a pair of ball bearings removably mounted in said cups; a supporting frame having spaced end members; one of said end members having a supporting surface shaped to tightly engage the mounting surface of one of said cups and the other end member having a supporting surface shaped for loose fit on the mounting surface of the second bearing cup to allow tilting and lateral shifting of the second bearing cup in exact coaxial and parallel alignment with each other; means to permit the insertion and removal of a mandrel between said end members to align said bearing axis; and cementing means between said second bearing cup and its adjacent end member to permanently secure said cup in said aligned position.

4. The method of aligning a pair of bearings in spaced coaxial relationship in the ends of a split supporting frame which includes the steps of: mounting an alignable bearing holder on one end of an accurate aligning mandrel; fitting the other end of said mandrel into the bearing receiving structure at one end of the supporting frame; placing the other end of said supporting frame around said mandrel and connecting said ends; cementing said bearing holder to said last mentioned frame end with said mandrel in place; separating the ends of said frame and removing said mandrel; and mounting bearings in said bearing receiving structure and said bearing holder and resecuring said ends together.

5. Apparatus for aligning pairs of bearings in spaced coaxial relationship which includes: a supporting frame having spaced end members, one of said end members being provided with means to removably receive a bearing therein in a predetermined fixed relationship to said end member and the other of said end members having a supporting surface therein; an alignable bearing holder having a receiving surface adapted to removably engage a bearing and hold it in fixed relationship relative to said holder and a mounting surface by which it may be supported in said supporting surface, said mounting and supporting surfaces being shaped to allow tilting and shifting of said holder relative to said frame to align said bearing holder in exact coaxial alignment with said bearing receiving means in the first mentioned end member; an aligning mandrel adapted to fit said bearing receiving means and said bearing holder to align said holder coaxially with said bearing receiving means; retaining means to permanently receive said bearing holder in said aligned position in said supporting frame; and means to permit the insertion and removal of said mandrel in said bearing holder and said bearing receiving means.

6. Apparatus for aligning pairs of bearings in spaced coaxial relationship which includes: a pair of bearing holders each having a receiving surface adapted to removably engage a bearing and hold it in fixed relationship relative to said holder and a mounting surface by which it may be supported; a supporting frame having separable end members, one of said end members having a supporting surface shaped to rigidly engage the mounting surface of one of said holders and the other end member having a supporting surface shaped to allow tilting and shifting of the second bearing holder relative thereto to align said bearing holders in exact coaxial and parallel alignment with each other; an aligning mandrel adapted to align said bearing holders in spaced coaxial and parallel relationship to each other; retaining means to permanently secure said second bearing holder in said aligned position in said supporting frame; and means for releasably securing said end members in a registered position to permit the insertion and removal of said mandrel therebetween.

References Cited by the Examiner
UNITED STATES PATENTS

| | | | |
|---|---|---|---|
| 1,941,022 | 12/1933 | Shelley | 29—468 |
| 2,236,956 | 4/1941 | Van der Heem | 29—155.5 X |
| 2,352,469 | 6/1944 | Carlson | 308—233 |
| 2,649,808 | 8/1953 | Slater et al. | 74—5 |
| 2,668,925 | 2/1954 | Bloser | 29—155.5 X |
| 2,919,586 | 1/1960 | Adkins | 74—5.44 |
| 2,944,297 | 7/1960 | Maynard | 264—68 |
| 3,002,261 | 10/1961 | Avila et al. | 264—278 |
| 3,043,147 | 7/1962 | Will | 74—5 |
| 3,172,197 | 3/1965 | Rutledge | 29—148.4 X |

WHITMORE A. WILTZ, *Primary Examiner.*

THOMAS H. EAGER, *Examiner.*